US012661832B2

(12) United States Patent
Kim et al.

(10) Patent No.: US 12,661,832 B2
(45) Date of Patent: Jun. 23, 2026

(54) APPARATUS FOR PRESS FORMING

(71) Applicant: SK On Co., Ltd., Seoul (KR)

(72) Inventors: Dong Ju Kim, Daejeon (KR); Sang Mo Kim, Daejeon (KR); Sun Min Park, Daejeon (KR); Jae Gyu Byun, Daejeon (KR); Taek Eon Jeong, Daejeon (KR)

(73) Assignee: SK On Co., Ltd., Seoul (KR)

( * ) Notice: Subject to any disclaimer, the term of this patent is extended or adjusted under 35 U.S.C. 154(b) by 10 days.

(21) Appl. No.: 17/979,093

(22) Filed: Nov. 2, 2022

(65) Prior Publication Data

US 2023/0182354 A1     Jun. 15, 2023

(30) Foreign Application Priority Data

Dec. 10, 2021     (KR) ........................ 10-2021-0176475

(51) Int. Cl.
*B29C 43/36*     (2006.01)
*B29C 43/32*     (2006.01)
*B29L 31/00*     (2006.01)

(52) U.S. Cl.
CPC .... *B29C 43/361* (2013.01); *B29C 2043/3222* (2013.01); *B29C 2043/3615* (2013.01); *B29L 2031/7146* (2013.01)

(58) Field of Classification Search
CPC ......... B29C 43/361; B29C 2043/3615; B29C 51/262; B29C 43/04; B29L 2031/7146; H01M 50/105
See application file for complete search history.

(56) References Cited

U.S. PATENT DOCUMENTS 5,250,255 A * 10/1993 Sagawa ..................... B22F 3/02
                                                              419/38
2001/0053395 A1* 12/2001 Hosoe ................... B29C 43/361
                                                              425/408

(Continued)

FOREIGN PATENT DOCUMENTS

JP         2014-083573 A      5/2014
KR         101073870 B1      10/2011
(Continued)

OTHER PUBLICATIONS

English Translation of KR-20180134133-A retrieved from Espacenet (Year: 2023).*

(Continued)

*Primary Examiner* — Abbas Rashid
*Assistant Examiner* — Elisa H Vera
(74) *Attorney, Agent, or Firm* — IP&T GROUP LLP

(57) ABSTRACT

The present disclosure relates to a press forming apparatus, comprising: a die in which a molded portion is formed by being recessed inwardly from an upper surface thereof; a stripper for fixing an object to be formed disposed on the die; a punch provided above the die to be movable upwardly and downwardly, and inserted into the molded portion when descending, to form an accommodating portion in the object to be formed, wherein a surface of the molded portion, in contact with the object to be formed, is curved, and the punch comprises a vent for blowing air onto an upper surface of the object to be formed. According to the present disclosure, a molded portion of the pouch film may be uniformly stretched, and occurrence of cracks may be prevented, so that workability and productivity may be improved. Furthermore, long-term reliability of the secondary battery may be secured.

12 Claims, 2 Drawing Sheets

100

(56)         References Cited

U.S. PATENT DOCUMENTS

2009/0224427 A1 * 9/2009 Micarelli ................ B29C 43/36
                                                            425/405.2
2018/0243966 A1    8/2018 Oh et al.
2020/0168853 A1    5/2020 Kim et al.
2022/0344789 A1 * 10/2022 Kim .................... H01M 10/049

FOREIGN PATENT DOCUMENTS

KR      10-2018-0134133  A     12/2018
KR         20180134133  A  * 12/2018   ............ B29C 51/10
KR         20200075989  A     6/2020
KR         10-2183764  B1    11/2020
WO     WO-2008038789  A1 *  4/2008   ........... B29C 43/003

OTHER PUBLICATIONS

WO-2008038789-A1 English translation of description retrieved from Espacenet (Year: 2024).*
European Search Report on the European Patent Application No. 22205177.3 issued by the European Patent Office on May 12, 2023.

* cited by examiner

APPARATUS FOR PRESS FORMING

CROSS-REFERENCE TO RELATED APPLICATION(S)

This application claims the benefit under 35 USC 119(a) of Korean Patent Application No. 10-2021-0176475 filed on Dec. 10, 2021 in the Korean Intellectual Property Office, the entire disclosure of which is incorporated herein by reference for all purposes.

BACKGROUND

The present disclosure relates to a press forming apparatus, and preferably to a press forming apparatus used for forming a pouch film for a secondary battery.

Unlike a primary battery that cannot be charged, a secondary battery that can be charged and discharged is widely used in small, high tech electronic devices such as mobile phones, PDAs, notebook computers, and the like, as well as mid-to-large devices such as electric vehicles, in recent years.

Such a secondary battery may be classified as a cylindrical secondary battery, a prismatic secondary battery, a pouch-type secondary battery, or the like, depending on the structure and manufacturing method thereof. Thereamong, the pouch-type secondary battery is manufactured by accommodating an electrode assembly in a pouch-type sheet and then sealing the sheet, and the pouch-type secondary battery has a simple structure and high capacitance per unit volume, compared to other types of secondary batteries, so it is widely used in automobile batteries, energy storage devices, or the like.

The pouch-type secondary battery includes an electrode assembly, an electrode lead coupled to the electrode assembly, and a pouch accommodating the electrode assembly with a tip of the electrode lead led out therefrom. More specifically, in the pouch-type secondary battery, an accommodating portion having a recessed shape is formed in a pouch-type sheet, and then an electrode assembly is accommodated in the accommodating portion, and the pouch-type sheet is folded so that one region of the pouch-type sheet covers the electrode assembly, and then a sealing portion sealing a periphery of the electrode assembly is formed, to manufacture the pouch-type secondary battery. The sealing portion generally has a shape protruding outwardly.

FIG. 1 schematically illustrates a pouch film forming apparatus generally used to form an accommodating portion in which an electrode assembly is accommodated. Referring to FIG. 1, a pouch film is disposed between a stripper and a die, fixed at a constant pressure, and an upper punch is lowered to form a pouch of a desired size. As described above, in the case of reaching a limit of ductility of a material of the pouch film in a process of forming by applying force to the pouch film, the pouch film may not be able to withstand the stress caused by molding and may be torn. In particular, pinholes or cracks tend to commonly occur in a corner portion of the pouch film.

Accordingly, there may be a problem in workability and productivity when forming the pouch film, and also, as elongation is decreased, there may be a problem in the long-term reliability of the pouch-type battery.

SUMMARY

The present disclosure has been devised in view of the above circumstances, and an aspect of the present disclosure is to provide a press forming apparatus capable of manufacturing pouches for secondary batteries having various shapes, as well as preventing a bent portion of the pouch film from being intensively stretched when forming a pouch film.

According to an aspect of the present disclosure, a press forming apparatus, includes: a die in which a molded portion is formed by being recessed inwardly from an upper surface thereof; a stripper for fixing an object to be formed disposed on the die; a punch provided above the die to be movable upwardly and downwardly, and inserted into the molded portion when descending, to form an accommodating portion in the object to be formed, wherein a surface of the molded portion, in contact with the object to be formed, is curved, and the punch includes a vent for blowing air onto an upper surface of the object to be formed.

According to an aspect of the present disclosure, a press forming apparatus, includes: a die in which a molded portion is formed by being recessed inwardly from an upper surface thereof; a stripper for fixing the object to be formed disposed on the die; and a punch provided above the die to be movable upwardly and downwardly, and inserted into the molded portion when descending, to form an electrode assembly accommodating portion in the object to be formed, wherein a surface of the molded portion, in contact with the object to be formed, has a polygonal shape, and the punch includes a vent for blowing air onto an upper surface of the object to be formed.

The air may be blown at a pressure of 0.1 to 10 MPa.

The vent may have a diameter of 1 to 100 mm.

The vent may be formed by penetrating through a central portion of a punch inserted into the molded portion.

The press forming apparatus may include a plurality of vents.

The molded portion of the die may further include an inlet for intaking air.

The molded portion of the die may include at least one selected from a group consisting of a silicone-based resin and a urethane-based resin.

The object to be formed may be a pouch film for a secondary battery exterior material.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figures 1, 2:
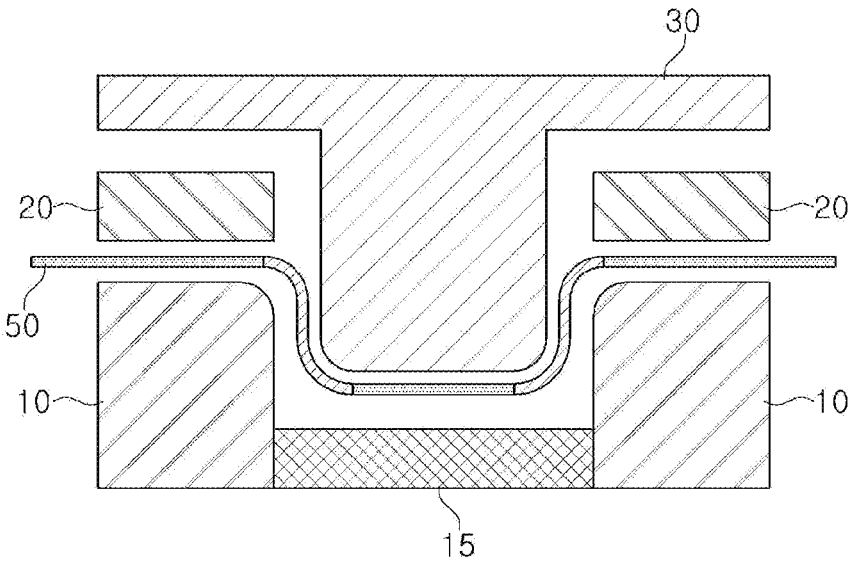
FIG. 1 schematically illustrates a pouch film forming apparatus generally used to form an accommodating portion in which an electrode assembly is accommodated.
FIG. 2 schematically illustrates a press forming apparatus according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, exemplary embodiments will be described with reference to various examples. However, embodiments of the present disclosure may be modified in various other forms, and the scope of the present disclosure is not limited to the embodiments described below.

Figure 3:
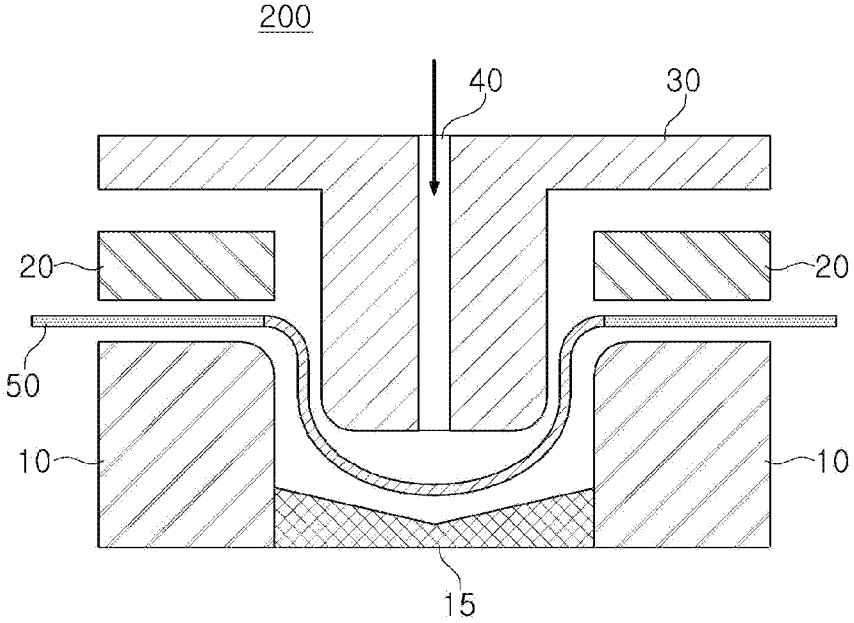
FIG. 3 schematically illustrates a press forming apparatus according to another embodiment of the present disclosure.

The present disclosure relates to a press forming apparatus, and FIG. 2 schematically illustrates a press forming apparatus according to an embodiment of the present disclosure, and FIG. 3 schematically illustrates a press forming apparatus according to another embodiment of the present disclosure. Hereinafter, the present disclosure will be described in more detail with reference to FIGS. 2 and 3.

According to an aspect of the present disclosure, a press forming apparatus 100 comprising a die 10 in which a molded portion 15 is formed by being recessed inwardly from an upper surface thereof; a stripper 20 for fixing an object to be formed 50 disposed on the die 10; and a punch 30 provided above the die 10 to be movable upwardly and downwardly and inserted into the molded portion 15 when descending, to form an accommodating portion in the object to be formed 50, wherein a surface of the molded portion 15, in contact with the object to be formed 50, has a curved shape, and the punch 30 comprises a vent 40 for blowing air onto an upper surface of the object to be formed 50, is provided.

According to another aspect of the present disclosure, a press forming apparatus 200 comprising a die 10 in which a molded portion 15 is recessed inwardly from an upper surface thereof; a stripper 20 for fixing an object to be formed 50 disposed on the die 10; and a punch 30 provided above the die 10 to be movable upwardly and downwardly and inserted into the molded portion 15 when descending, to form an electrode assembly accommodating portion in the object to be formed 50, wherein a surface of the molded portion 15, in contact with the object to be formed 50, has a polygonal shape, and the punch 30 comprises a vent 40 for blowing air onto an upper surface of the object to be formed 50, is provided.

The press forming apparatus of the present disclosure may be used to form the object to be formed 50 of various materials in various shapes depending on the use, and the type of the object to be formed 50 is not particularly limited. As an example, the object to be formed 50 may be a pouch film used as an exterior material for secondary batteries. Although not particularly limited, the pouch film includes a gas barrier layer, a surface protection layer, and a sealant layer. The gas barrier layer is intended to block gas ingress, and may include metal and an aluminum thin film (Al Foil) may be mainly used. The surface protection layer is positioned as an outermost layer to protect the electrode assembly from friction and collision with the outside, and a polymer such as a nylon resin or PET having mainly abrasion resistance and heat resistance may be used. The sealant layer is positioned in an innermost layer to directly be in contact with the electrode assembly, and a polymer such as polypropylene (PP) may be mainly used.

In the press forming apparatus of the present disclosure, the die 10 is disposed below the object to be formed 50, and the die 10 may have a recessed molded portion 15 formed in a shape of a groove.

The stripper 20 may serve to fix the object to be formed 50 by applying a predetermined pressure to the object to be formed 50 disposed on the die 10. When the punch 30 is applied to the object to be formed 50, if the pressure applied to the stripper 20 is excessive, damage such as the object to be formed 50 being torn may occur, in consideration thereof, the pressure applied to the stripper 20 is preferably controlled appropriately.

A punch 30 may be provided above the die 10 to be movable upwardly and downwardly, descend and be inserted into the molded portion 15 to form an accommodating portion in the object to be formed 50, and the punch 30 may include a vent 40 for blowing air onto an upper surface of the object to be formed 50.

As the vent 40 descends, air is blown onto an upper surface of the object to be formed 50 to form a predetermined air pocket at an interface of the object to be formed 50, and by pressure of the air, an entirety of the object to be formed 50 positioned on the molded portion 15 is uniformly stretched in a downward direction and is in close contact with an inner surface of the molded portion 15, and in particular, as illustrated by a hatched portion of the object to be formed 50 of FIG. 2, the pouch film may be uniformly stretched to a corner and a vertex portion connecting a bottom surface and an inner wall surface of the forming 15 or a corner portion in which an inner wall surface and an outer side surface thereof are connected, to mold an accommodating portion, and accordingly, the object to be formed 50 may be stably stretched, so that occurrence of cracks may be prevented when the punch 30 forms the object to be formed 50.

The vent 40 may be formed by penetrating from an upper surface to a lower surface of the punch 30 inserted into the molded portion 15. Meanwhile, the position in which the vent 40 is formed is not particularly limited, but in order to apply a uniform pressure to the object to be formed 50 as a whole, the vent 40 is preferably formed by penetrating through a central portion of the punch 30 inserted into the molded portion 15.

According to another embodiment of the present disclosure, the press forming apparatus of the present disclosure may include a plurality of vents 40. For example, the vent 40 may be formed in plural by penetrating the lower surface from the upper surface of the punch 30 so as to spray air toward a central portion and both end portions of the upper surface of the pouch film. By including the plurality of vents 40, the object to be formed 50 may be stretched more quickly and uniformly Meanwhile, the air from the vent 40 is preferably blown at a pressure of 0.1 to 10 Mpa. When the pressure thereof is less than 0.1 Mpa, an effect of blowing may be reduced and there may be no stretching effect of the pouch, and when the pressure thereof exceeds 10 Mpa, depending on excessive blowing, the pouch may be excessively stretched, there is a concern that the pouch may be torn or the quality thereof deteriorated, due to microcracks.

Although not particularly limited, a diameter of the vent 40 is preferably 1 to 100 mm. When the diameter thereof is less than 1 mm, there is a problem in that a stretching effect of the pouch is insignificant due to insufficient air inflow into the punch. On the other hand, when the diameter thereof exceeds 100 mm, an inflow of air into the punch is excessively increased, so that there may be a problem in that the pouch may be torn due to excessive stretching of the pouch, or the quality of the pouch may be deteriorated due to microcracks.

Meanwhile, a surface of the molded portion 15 of the die 10, in contact with the object to be formed 50, may have a curved shape or polygonal shape. Accordingly, an elongation of a corner portion of a pouch in which a secondary battery is accommodated, so that a thicker cell can be manufactured. In addition, due to the punch, it is possible to prevent the deterioration of the quality due to an appearance defect occurring in the pouch such as scratches, wrinkles, scratches and cracks, there is an advantage in that the punch design is easy to improve the defect. Furthermore, according to the shape of the surface of the molded portion 15 of the die 10, in contact with the object to be formed 50, pouches having various appearances may be manufactured.

Meanwhile, the press forming apparatus of the present disclosure may be made of a metal material such as stainless steel, and according to an embodiment of the present disclosure, the molded portion 15 of the die 10 may include a silicone-based or urethane-based resin. By forming the molded portion 15 of the die 10 with a soft silicone-based or urethane-based resin, it is possible to more significantly reduce appearance defects such as scratches, wrinkles, scratches and cracks occurring in the pouch.

An inlet for intaking air may be additionally formed in the molded portion 15 of the die 10. As described above, when the object to be formed 50 is formed with the punch 30, after stretching the object to be formed 50 by air from the vent 40, the inlet may quickly intake and remove air between the punch 30 and the molded portion 15, and accordingly, the punch 30 may be in close contact with the molded portion 15, so that the pouch film may be formed more precisely.

According to another aspect of the present disclosure, a secondary battery including a pouch film formed by the above-described press forming apparatus and an electrode assembly accommodated in the pouch film.

The electrode assembly includes a positive electrode, a negative electrode, and a separator included between the positive electrode and the negative electrode, and any positive electrode, negative electrode, and separator known in the art may be used as the positive electrode, negative electrode, and separator.

For example, the positive electrode may include a positive electrode mixture layer formed on a positive electrode current collector. The positive electrode current collector is not particularly limited, but a thin plate made of aluminum, stainless steel, or nickel may be used, and it is preferable to use a thin plate made of aluminum. In addition, a porous body such as a net-shaped type or mesh-shaped type may be used, and may be coated with an oxidation-resistant metal or alloy film to prevent oxidation.

The positive electrode mixture layer may include a positive electrode active material, a binder, and a conductive material, and the positive electrode active material is a compound capable of reversible intercalation and deintercalation of lithium, and may include a lithium transition metal composite oxide containing at least one transition metal consisting of nickel, cobalt, manganese and aluminum, and lithium, and preferably, a lithium transition metal composite oxide containing transition metal containing nickel, cobalt, and manganese, and lithium.

A binder may be additionally included in order to improve binding of an active material, a conductive material, and the like, and adhesion to a current collector, it may include for example, at least one of polyvinylidene fluoride, polyvinyl alcohol, carboxymethyl cellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber and fluororubber, and preferably, polyvinylidene fluoride.

The conductive material for improving conductivity may be at least one selected from a group consisting of graphite, carbon black, carbon nanotubes, metal powder, and conductive oxides.

The negative electrode may include a negative electrode mixture layer formed on a negative electrode current collector. As the negative electrode current collector, copper, stainless steel, aluminum, nickel, titanium, calcined carbon, one in which a surface of copper or stainless steel is surface-treated with carbon, nickel, titanium, silver, or the like, an aluminum-cadmium alloy, and the like, may be used. In addition, like the positive electrode current collector, bonding strength of the negative electrode active material may be strengthened by forming fine irregularities on a surface thereof, and may be used in various forms such as a film, sheet, foil, net, porous body, foam, non-woven body, and the like.

The negative active material may be a silicon-based negative active material and/or a carbon-based negative active material. Although not particularly limited, the silicon-based negative active material may be at least any one selected from a group consisting of SiOx ($0 \leq x < 2$) particles, a Si—C composite, and a Si—Y alloy (where Y is an alkali metal, alkaline earth metal, transition metal, group 13 element, group 14 elements, rare earth elements, and combinations thereof), and for example, SiO. The carbon-based negative active material may be, for example, at least one selected from a group consisting of artificial graphite, natural graphite, and graphitized mesocarbon microbeads, and is preferably artificial graphite.

The negative electrode mixture layer may also include a binder and a conductive material. The binder may include an aqueous binder and a rubber-based binder, and the aqueous binder may be dissolved in an aqueous solvent such as water, or the like, and may include at least one selected from a group consisting of polyvinyl alcohol (PVA), polyacrylic acid (PAA), polyethylene glycol (PEG), polyacrylonitrile (PAN) and polyacryl amide (PAM), and carboxylmethyl cellulose (CMC). The rubber-based binder does not dissolve well in aqueous solvents such as water, or the like, but may be defined as being able to be smoothly dispersed in an aqueous solvent. Specifically, the rubber-based binder may include at least one selected from styrene butadiene rubber (SBR), hydrogenated nitrile butadiene rubber (HNBR), acrylonitrile butadiene rubber, acrylic rubber, butyl rubber, and fluoro rubber, and preferably, include at least one selected from a group consisting of styrene-butadiene rubber and hydrogenated nitrile-butadiene rubber, more preferably styrene-butadiene rubber, in terms of easy dispersion and excellent phase stability.

In addition, the conductive material may be at least one selected from a group consisting of graphite, carbon black, carbon nanotubes, metal powder, and conductive oxides.

In addition, as a separator, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, and the like, may be used alone or by laminating thereof, or a nonwoven fabric, for example, a high melting point glass fiber, a nonwoven fabric made of polyethylene terephthalate fiber, or the like, may be used, but is not limited thereto.

As set forth above, according to the present disclosure, a molded portion of a pouch film may be uniformly elongated, thereby preventing cracks, or the like from occurring, and furthermore, long-term reliability of the secondary battery, thereby improving workability and productivity, and furthermore, long-term reliability of the secondary battery may be secured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A press forming apparatus, comprising:
a die in which a molded portion is formed by being recessed inwardly from an upper surface thereof;
a punch provided above the die to be movable upwardly and downwardly, and inserted into the molded portion when moving downwardly toward the die; and
a stripper positioned between the die and the punch and configured to fix an object to be formed disposed on the die by applying pressure to the object to be formed while the punch is being inserted into the molded portion to form an accommodating portion in the object to be formed,
wherein a surface of the molded portion, in contact with the object to be formed, is curved,
wherein the punch comprises a vent for blowing air onto an upper surface of the object to be formed,
wherein the molded portion includes an air intake inlet configured to remove air between the punch and the molded portion, and
wherein the molded portion of the die comprises a urethane-based resin.

2. The press forming apparatus of claim 1, wherein the air is blown at a pressure of 0.1 to 10 Mpa.

3. The press forming apparatus of claim 1, wherein the vent has a diameter of 1 to 100 mm.

4. The press forming apparatus of claim 1, wherein the vent is formed by penetrating through a central portion of the punch inserted into the molded portion.

5. The press forming apparatus of claim 1, wherein the punch comprises a plurality of vents.

6. The press forming apparatus of claim 1, wherein the object to be formed is a pouch film for a secondary battery exterior material.

7. A press forming apparatus, comprising:
a die in which a molded portion is formed by being recessed inwardly from an upper surface thereof;
a punch provided above the die to be movable upwardly and downwardly, and inserted into the molded portion when moving downwardly toward the die; and
a stripper positioned between the die and the punch and configured to fix an object to be formed disposed on the die by applying pressure to the object to be formed while the punch is being inserted into the molded portion to form an electrode assembly accommodating portion in the object to be formed,
wherein a surface of the molded portion, in contact with the object to be formed, has a polygonal shape,
wherein the punch comprises a vent for blowing air onto an upper surface of the object to be formed,
wherein the molded portion includes an air intake inlet configured to remove air between the punch and the molded portion, and
wherein the molded portion of the die comprises a urethane-based resin.

8. The press forming apparatus of claim 7, wherein the air is blown at a pressure of 0.1 to 10 Mpa.

9. The press forming apparatus of claim 7, wherein the vent has a diameter of 1 to 100 mm.

10. The press forming apparatus of claim 7, wherein the vent is formed by penetrating through a central portion of the punch inserted into the molded portion.

11. The press forming apparatus of claim 7, wherein the punch comprises a plurality of vents.

12. The press forming apparatus of claim 7, wherein the object to be formed is a pouch film for a secondary battery exterior material.

* * * * *